(12) United States Patent
Kindermann et al.

(10) Patent No.: US 12,311,761 B2
(45) Date of Patent: May 27, 2025

(54) INFOTAINMENT SYSTEM HAVING AWARENESS OF LOCAL DYNAMIC FEATURES

(71) Applicant: Cerence Operating Company, Burlington, MA (US)

(72) Inventors: Daniel Mario Kindermann, Aachen (DE); Mohammad Mehdi Moniri, Aachen (DE); Aditya Gulati, Aachen (DE)

(73) Assignee: Cerence Operating Company, Burlington, MA (US)

( * ) Notice: Subject to any disclaimer, the term of this patent is extended or adjusted under 35 U.S.C. 154(b) by 288 days.

(21) Appl. No.: 17/693,491

(22) Filed: Mar. 14, 2022

(65) Prior Publication Data

US 2022/0314797 A1    Oct. 6, 2022

Related U.S. Application Data

(60) Provisional application No. 63/168,519, filed on Mar. 31, 2021.

(51) Int. Cl.
| | |
|---|---|
| *B60K 35/10* | (2024.01) |
| *B60K 35/00* | (2024.01) |
| *B60K 35/28* | (2024.01) |
| *B60K 35/85* | (2024.01) |
| *G06F 3/01* | (2006.01) |

(52) U.S. Cl.
CPC .............. *B60K 35/00* (2013.01); *B60K 35/10* (2024.01); *B60K 35/28* (2024.01); *B60K 35/85* (2024.01); *B60K 2360/1464* (2024.01); *B60K 2360/148* (2024.01); *B60K 2360/149* (2024.01); *B60K 2360/164* (2024.01); *B60K 2360/167* (2024.01); *B60K 2360/5899* (2024.01); *G06F 3/017* (2013.01)

(58) Field of Classification Search
CPC ........ B60K 35/00; B60K 35/10; B60K 35/28; B60K 35/85; B60K 2360/1464; B60K 2360/148; B60K 2360/149; B60K 2360/164; B60K 2360/167; B60K 2360/5899; B60K 2360/592; B60K 2360/583; B60K 35/60; B60K 2360/146; G01C 21/3608; G06F 3/017

See application file for complete search history.

(56) References Cited

U.S. PATENT DOCUMENTS

| | | | | |
|---|---|---|---|---|
| 11,637,885 B2 * | 4/2023 | Jurzak | ................... | H04L 65/762 |
| | | | | 709/201 |
| 2008/0316011 A1 * | 12/2008 | Kirsch | .................. | B60K 35/00 |
| | | | | 340/439 |

(Continued)

FOREIGN PATENT DOCUMENTS

| | | | | |
|---|---|---|---|---|
| JP | 5233655 B2 | * | 7/2013 | |
| TW | 201403364 A | * | 1/2014 | |

*Primary Examiner* — Daniel M. Robert
(74) *Attorney, Agent, or Firm* — Occhiuti & Rohlicek LLP

(57) ABSTRACT

A vehicle and many dynamic features move relative to the same reference frame. An infotainment system responds to a request from an occupant of a vehicle to provide information concerning a particular dynamic feature. The occupant provides the infotainment system with information concerning a bearing to the dynamic feature and the infotainment system identifies the dynamic feature in response.

19 Claims, 4 Drawing Sheets

(56) References Cited

U.S. PATENT DOCUMENTS

| | | | | |
|---|---|---|---|---|
| 2013/0281141 | A1* | 10/2013 | Rubin | G08G 1/163 |
| | | | | 455/500 |
| 2014/0361973 | A1* | 12/2014 | Raux | G06F 3/013 |
| | | | | 715/863 |
| 2015/0193005 | A1* | 7/2015 | Di Censo | G06F 9/453 |
| 2015/0317523 | A1* | 11/2015 | Clark | G08B 21/02 |
| | | | | 348/148 |
| 2016/0101779 | A1* | 4/2016 | Katoh | G08G 1/166 |
| | | | | 340/435 |
| 2016/0167648 | A1* | 6/2016 | James | B60Q 1/507 |
| | | | | 701/28 |
| 2016/0247407 | A1* | 8/2016 | Paczan | B64C 39/024 |
| 2016/0357262 | A1* | 12/2016 | Ansari | G06V 20/59 |
| 2017/0032402 | A1* | 2/2017 | Patsiokas | G06Q 30/0207 |
| 2017/0039848 | A1* | 2/2017 | Hakeem | H04M 1/72412 |
| 2017/0176207 | A1* | 6/2017 | Jones | G01C 21/3664 |
| 2017/0192089 | A1* | 7/2017 | Parker | G01S 7/414 |
| 2018/0203457 | A1* | 7/2018 | Moosaei | G05D 1/0246 |
| 2018/0357040 | A1* | 12/2018 | Spiewla | G06F 3/0488 |
| 2019/0035270 | A1* | 1/2019 | Astigarraga | G08G 1/096783 |
| 2019/0212167 | A1* | 7/2019 | Yamada | G01C 21/3602 |
| 2019/0219997 | A1* | 7/2019 | Benda | G05D 1/0016 |
| 2019/0228242 | A1* | 7/2019 | Yamaoka | G06V 20/597 |
| 2020/0019170 | A1* | 1/2020 | Seo | G05D 1/028 |
| 2020/0218488 | A1* | 7/2020 | Nguyen | G06F 3/0482 |
| 2021/0129766 | A1* | 5/2021 | Kim | B60R 1/24 |
| 2021/0287040 | A1* | 9/2021 | Al-Qunaieer | G06T 7/0002 |
| 2021/0382560 | A1* | 12/2021 | Barth | G06F 3/017 |
| 2022/0314797 | A1* | 10/2022 | Kindermann | B60K 35/00 |

* cited by examiner

INFOTAINMENT SYSTEM HAVING AWARENESS OF LOCAL DYNAMIC FEATURES

CROSS-REFERENCE TO RELATED APPLICATIONS

This application claims the benefit of the Mar. 31, 2021 priority date of U.S. Provisional Application No. 63/168,519, which is incorporated herein by reference.

BACKGROUND

The advent of GPS systems has made it possible to provide information about various features in the vehicle's environments. These features are typically stationary features, such as monuments, buildings, natural features, and the like.

SUMMARY

The invention provides an infotainment system for a vehicle that is configured to make itself aware and knowledgeable about moving objects in the vehicle's environment. These moving objects are continuously dynamic transient units that are present within the geospatial vicinity of a vehicle. The system relies in part on each such unit's geospatial position or orientation relative to the vehicle. Examples of such units include buses, trains, and airplanes.

In one aspect, the invention features an infotainment system that responds to a request from a vehicle's occupant vehicle to provide information concerning a dynamic feature. The dynamic feature is a feature that has a time-varying location relative to a stationary reference frame relative to which the vehicle moves. The vehicle includes an internal sensor system, an external sensor system, and a kinematic sensor system. The infotainment system includes an identifier that is configured to identify the dynamic feature based at least in part on either information from the kinematic sensor system, information from the external sensor system, or both.

Embodiments include those in which the infotainment system detects the request based on input received through the internal sensor system. Among these are embodiments in which the infotainment system includes a speech interface through which the infotainment system receives information indicative of an utterance by the occupant. Also, among these embodiments are those in which the vehicle's internal sensors include an internal camera that is directed to view a cabin in which the occupant is disposed, in which case the infotainment system receives information indicative of a gesture by the occupant. Examples of such gestures include a direction in which the user points and a direction in which the user gazes.

Embodiments further include those in which the identifier identifies the dynamic feature as being a particular motor vehicle, those in which the identifier identifies the dynamic features as being a particular bus, and those in which the identifier identifies the dynamic feature as being a particular aircraft.

Also among the embodiments are those in which the external sensor system includes an external camera and the identifier identifies the dynamic feature based at least in part on an image obtained by the camera, those in which the external sensor system includes a radar system and the identifier identifies the dynamic feature based at least in part on a radar return from the dynamic feature, those in which the external sensor system includes a lidar system and the identifier identifies the dynamic feature based at least in part on a lidar return from the dynamic feature, and those in which the external sensor system includes an external microphone and the identifier identifies the dynamic feature based at least in part on an acoustic signature detected by the external microphone.

In some embodiments, the identifier identifies the dynamic feature based at least in part on both the information from the kinematic sensor system and the information from the external sensor system.

Also, among the embodiments are those in which the infotainment system further includes an interactor that is configured to receive information from the identifier and to provide additional information concerning the dynamic feature. The additional information is information that is unobservable by the external sensor system and unobservable by the kinematic sensor system.

In some embodiments, the infotainment system includes both a metadata source and an interactor. The interactor is configured to receive information from the identifier and to obtain, from the metadata source, additional information concerning the dynamic feature. The interactor then provides the additional information for communication to the occupant in response to the request.

In some embodiments, the infotainment system further comprises a metadata source that establishes a live link to a head unit for providing, to the head unit, additional information concerning said dynamic feature.

Also, among the embodiments are those in which the infotainment system further includes a head unit mounted in the vehicle, the head unit including a processor and a memory that are configured to cooperate in executing the identifier.

Still other embodiments are those in which infotainment server includes a remote server and wherein the vehicle includes a network interface for providing communication with the remote server via a wide-area network.

In still other embodiments, the is configured to track the dynamic feature over time after having identified the dynamic feature.

In another aspect, the invention features an infotainment system that responds to a request from an occupant of a vehicle to provide information concerning a particular dynamic feature. The occupant provides the infotainment system with information concerning a bearing to the dynamic feature and the infotainment system identifies the dynamic feature in response.

All of the foregoing methods are to be construed as executing in a non-abstract manner. All systems described above are likewise non-abstract systems.

As used herein, Applicant, acting as his own lexicographer, hereby defines "non-abstract" is the converse of "abstract" as the Courts have defined the term as of the filing date of this application. Notice is hereby given that any person who construes the claims to be other than "non-abstract" is construing the claims in a manner that is not in light of the specification.

As used herein, an occupant of the vehicle is either a passenger or a driver.

The infotainment system described herein is made of matter and is thus of a tangible and non-abstract form. Preferably, the matter is baryonic matter. During operation, the infotainment system described herein consumes energy and generates waste heat. As such, it affects the physical environment in a non-abstract way.

The methods and systems described herein are non-abstract methods and systems. All descriptions of abstract methods and systems have been omitted. Accordingly, the claims can only be construed to cover non-abstract methods and systems.

DETAILED DESCRIPTION

Figure 1:
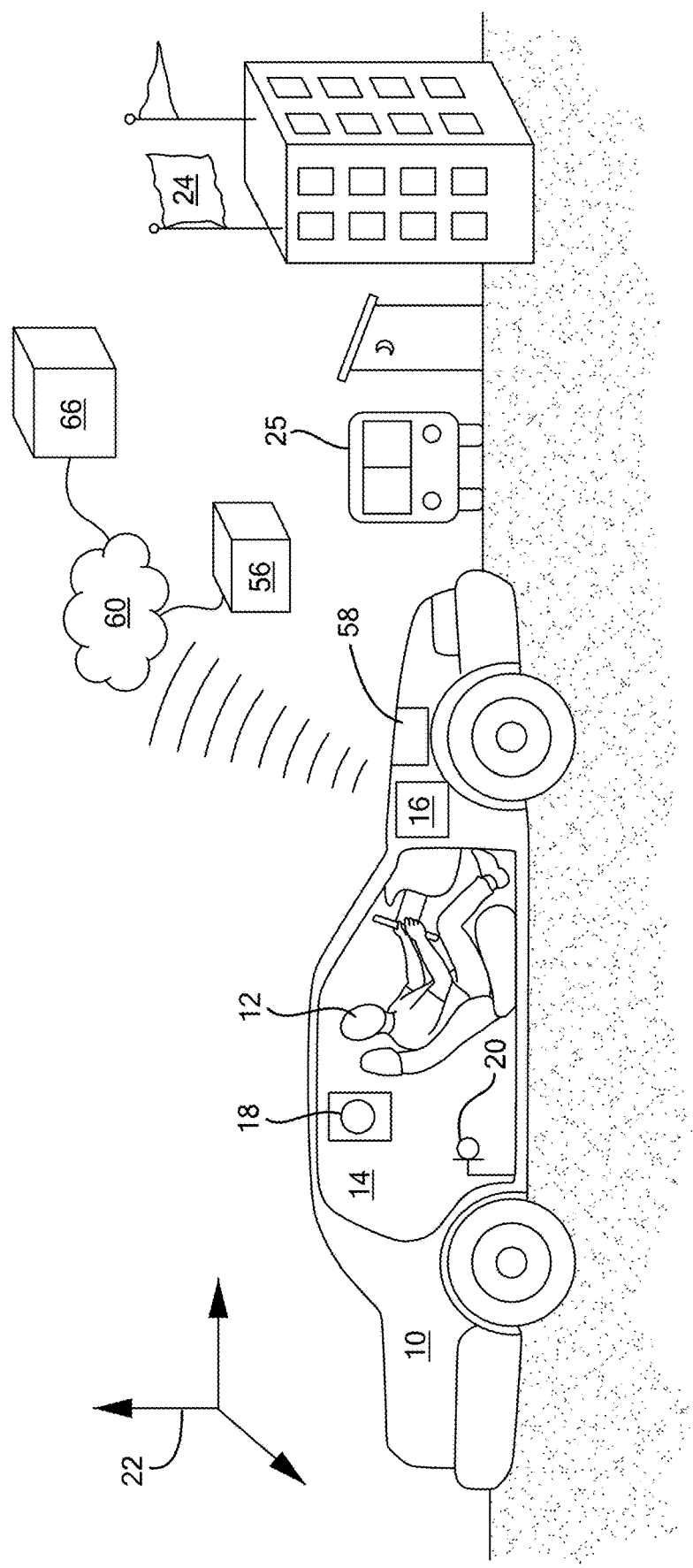
FIG. 1 shows an automobile with other dynamic features in a stationary reference frame.

FIG. 1 shows a passenger vehicle 10 having an occupant 12 within a cabin 14. The passenger vehicle 10 features an infotainment system 16 that communicates with the occupant 12 via loudspeakers 18 and one or more internal microphones 20.

The vehicle 10 moves in a stationary reference frame 22. The reference frame 22 includes static features 24 and dynamic features 25. Static features 24 are those that do not move relative to the reference frame 22. Dynamic features 25 are those that move relative to the reference frame 22. The vehicle 10 is thus a dynamic feature 25, along with other vehicles, including buses, trains, streetcars, and aircraft.

Figure 2:
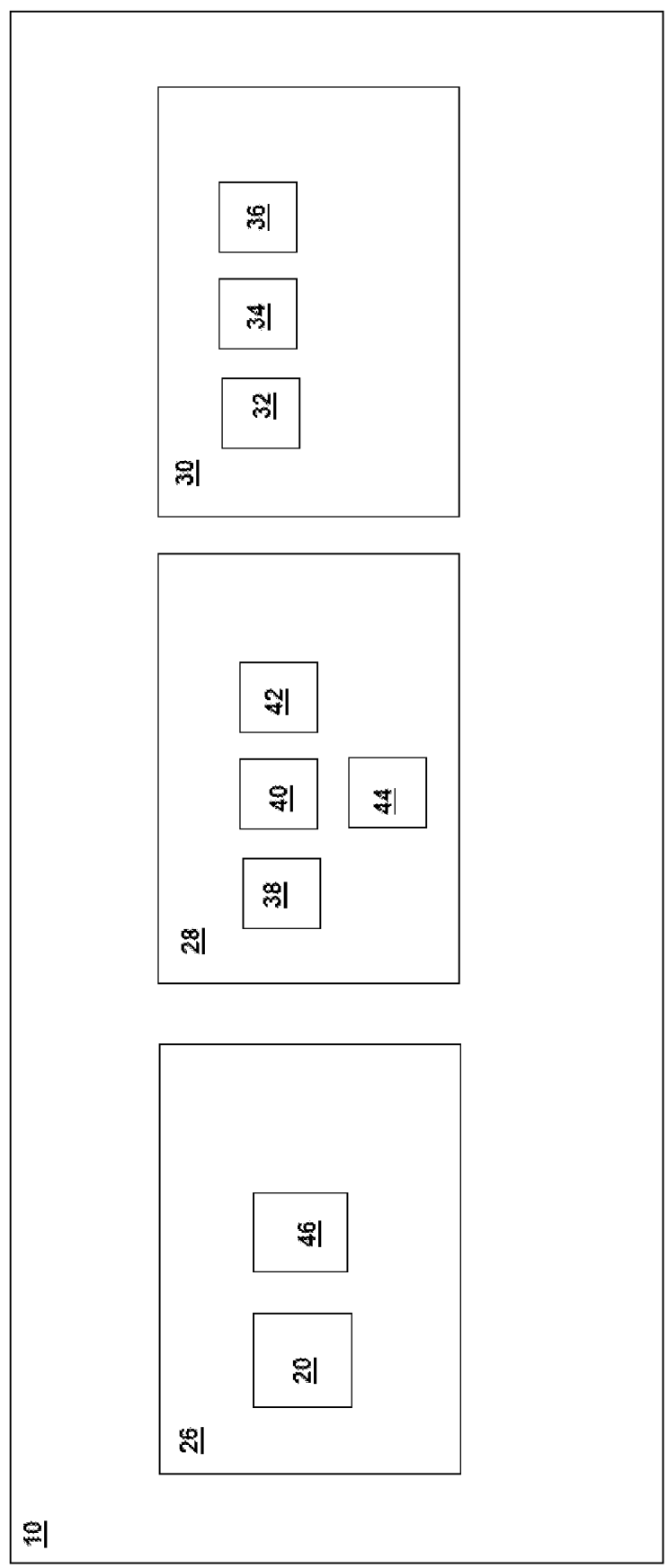
FIG. 2 shows sensor internal, external, and kinematic sensor systems within the automobile shown in FIG. 1.

Referring to FIG. 2, the vehicle 10 includes a variety of sensor systems, namely an internal sensor system 26, an external sensor system 28, and a kinematic sensor system 30.

The kinematic sensor system 30 includes one or more sensors that provide information concerning the vehicle's kinematic attributes relative to the reference frame 22. Such kinematic attributes include location within the reference frame 22, as well as velocity and acceleration relative to this reference frame 22. Examples of kinematic sensors include a GPS 32, a velocimeter 34, and an accelerometer 36.

The external sensor system 28 includes sensors that provide information concerning static and dynamic features 25 in the vehicle's environment. These sensors include passive sensors, such as an external camera 38 and an external microphone 40, as well as active sensors, such as those that radiate an electromagnetic wave and listen for a response. Examples of the latter include a radar 42 or lidar 44, which return radar signatures and lidar signatures that are unique to particular classes of dynamic features and information concerning motion of those dynamic features relative to the vehicle 10 and relative to the stationary reference frame 22. Based on information from these external sensors, it is possible to obtain information concerning a feature's bearing relative to the vehicle 10 and its distance, velocity, and acceleration relative to the vehicle 10.

The internal sensor system 26 includes internal sensors that provide information concerning activity within the vehicle's interior. Examples of such sensors include the internal microphone 20 and an internal camera 46. Such sensors provide information on what an occupant 12 is saying and what an occupant 12 is doing, and in particular, any semantically significant gestures.

Figure 3:
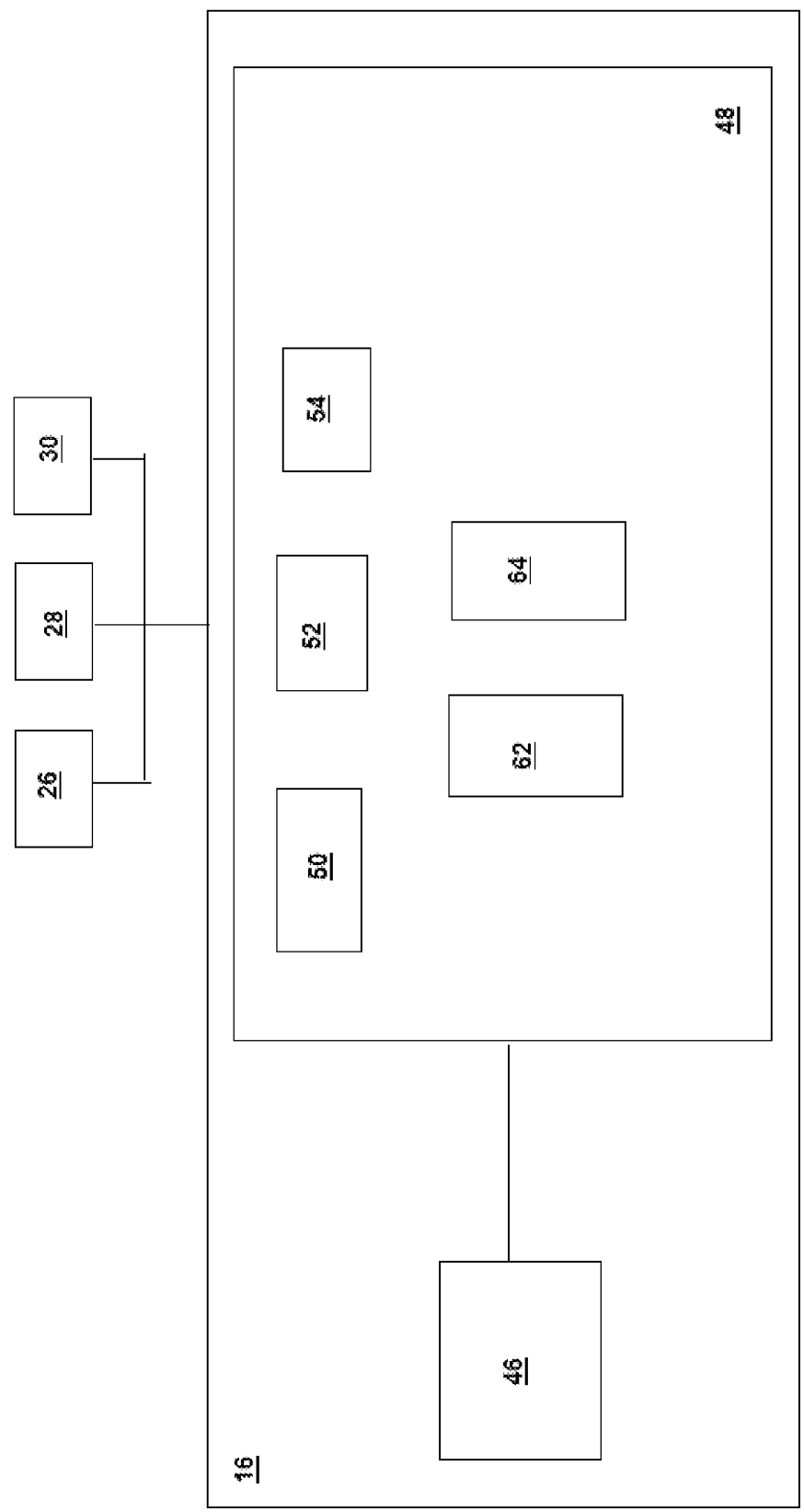
FIG. 3 shows the architecture of an infotainment system that serves the automobile of FIG. 1.

Referring to FIG. 3, the infotainment system 16 typically includes a head unit 48 having a processor 50 and a memory 52. The head unit 48 includes a speech interface 54 that processes speech obtained through the internal microphones 20 and responds using synthesized speech that activates a loudspeaker 18.

Referring back to FIG. 1, in some embodiments, the infotainment system 16 includes a remote server 46 that cooperates with the head unit 48 when executing an application. To promote such cooperation, the vehicle 10 includes a network interface 58 to provide communication with the remote server via a wide-area network 60, such as the Internet.

The infotainment system 16 executes various applications either at the head unit 48, at the remote server, or both. Among the applications are those that provide information concerning a dynamic feature 25 in the vehicle's environment. As shown in FIG. 3, two such applications are a dynamic-feature identifier 62 and a dynamic-feature interactor 64.

The dynamic-feature identifier 62 receives input from the external sensor system 28 and from the kinematic sensor system 30. The dynamic-feature identifier 62 uses that input to obtain observable characteristics of a dynamic feature 25 in the vehicle's local environment. Examples of observable features include the manner in which the dynamic feature 25 interacts with waves incident thereon. Such waves include electromagnetic waves or acoustic waves.

The external camera 38 receives electromagnetic waves scattered from the dynamic feature 25. These provide a basis for inferring its general shape and location. The radar 42 and lidar 44 provide a way to detect range and, using Doppler shift, relative velocity. Various wavelengths of electromagnetic waves are useful. Shorter wavelengths provide better resolution, but longer wavelengths are more effective at penetrating fog.

The external microphone 40 (FIG. 2) is likewise suited for receiving acoustic waves emitted from a dynamic feature 25. Such acoustic waves are useful for identifying the feature since different vehicles make different sounds.

As an example, the identifier 62 is able to infer, from external sensors, the size and shape of a dynamic feature 25 as well as its velocity. Based on such observables, it is possible for the identifier 62 to determine that the dynamic feature 25 is a bus or a train. If the bus has a route number, the external sensor is able to acquire that number and obtain still more information concerning the bus.

In some cases, the identifier 62 attempts to identify a dynamic feature 25 in response to a request from the occupant 12. Among these cases are those in which the request arrives by a spoken utterance to the infotainment system 16. Also, among these cases are those in which the internal camera detects an occupant's semantically significant gesture. For example, if an occupant 12 says, "What's that?" and points in a particular direction, the identifier 62 receives information indicating the direction and proceeds to examine sensor data concerning any features in that direction. Based on this sensor data, the identifier 62 is able to offer the occupant 12 information concerning a dynamic feature 25 whose bearing relative to the vehicle 10 is consistent with the direction in which the occupant 12 pointed.

Having done so, the identifier 62 is in a position to initiate tracking of the dynamic feature 25. This is particularly useful, for example, when traveling with other vehicles in convoy or in a caravan. In such cases, it is easy to lose visual contact with whatever vehicle one is following, particularly in heavy traffic or on winding roads. A particularly common occurrence is that of being left behind at a traffic light.

As a result of its knowledge of traffic and the dynamic feature's destination, it is possible for the identifier 62 to estimate where the vehicle being followed actually is. This eliminates the tension associated with ensuring that the vehicle being followed is always in sight.

There is, however, a limit to the information that the identifier 62 can provide. After all, not everything can be obtained from observation. For example, if the identifier 62 determines the route number of a bus from image analysis, it will not know if the bus is crowded or where the bus is going. To obtain further information concerning a dynamic feature 25, it is necessary to invoke the interactor 64.

The interactor 64 receives information from the identifier 62 concerning the identity of the dynamic feature 25. Based on this information, the interactor 64 connects to a metadata source 66. Examples of a metadata source 66 include a geolocation tracking service, such as those provided by various state and private agencies. Examples of information acquired from a metadata source 66 include information about the dynamic feature's final destination, its origin, its current status, estimated arrival time, traffic status along its route, and current occupancy.

As a result of having established such a connection, the interactor 64 obtains useful knowledge concerning the dynamic feature 25 that has been provided to it.

In some cases, the interactor 64 establishes a live link with the metadata source 66. Upon establishing a suitable link and obtaining the occupant's approval, the interactor 64 classifies the dynamic feature 25 as a "tracked feature." Having done so, the interactor 64 provides dynamic real-time information concerning the differences between the kinematic vectors associated with the vehicle 10 and those associated with the tracked dynamic feature 25.

For example, based on the velocity vector of the tracked feature and that of the vehicle 10, it is possible to obtain a vector difference that provides the velocity of the dynamic feature 25 relative to the vehicle 10. The same operation can be carried out between the position vectors of the vehicle 10 and the tracked feature or indeed for any pair of kinematic vectors. This provides a way to carry out a continuous calculation of the absolute heading of both the vehicle 10 and the tracked dynamic feature 25 as well as the relative headings of both the vehicle 10 and the tracked feature. Similarly, this procedure also provides a basis for computing a distance between the vehicle 10 and the tracked dynamic feature 25. the rate of change of that distance, and the ability to anticipate the relative locations of the vehicle 10 and the dynamic feature 25 in the near future subject in a manner that continuously corrects for traffic fluctuations in real time.

Figure 4:
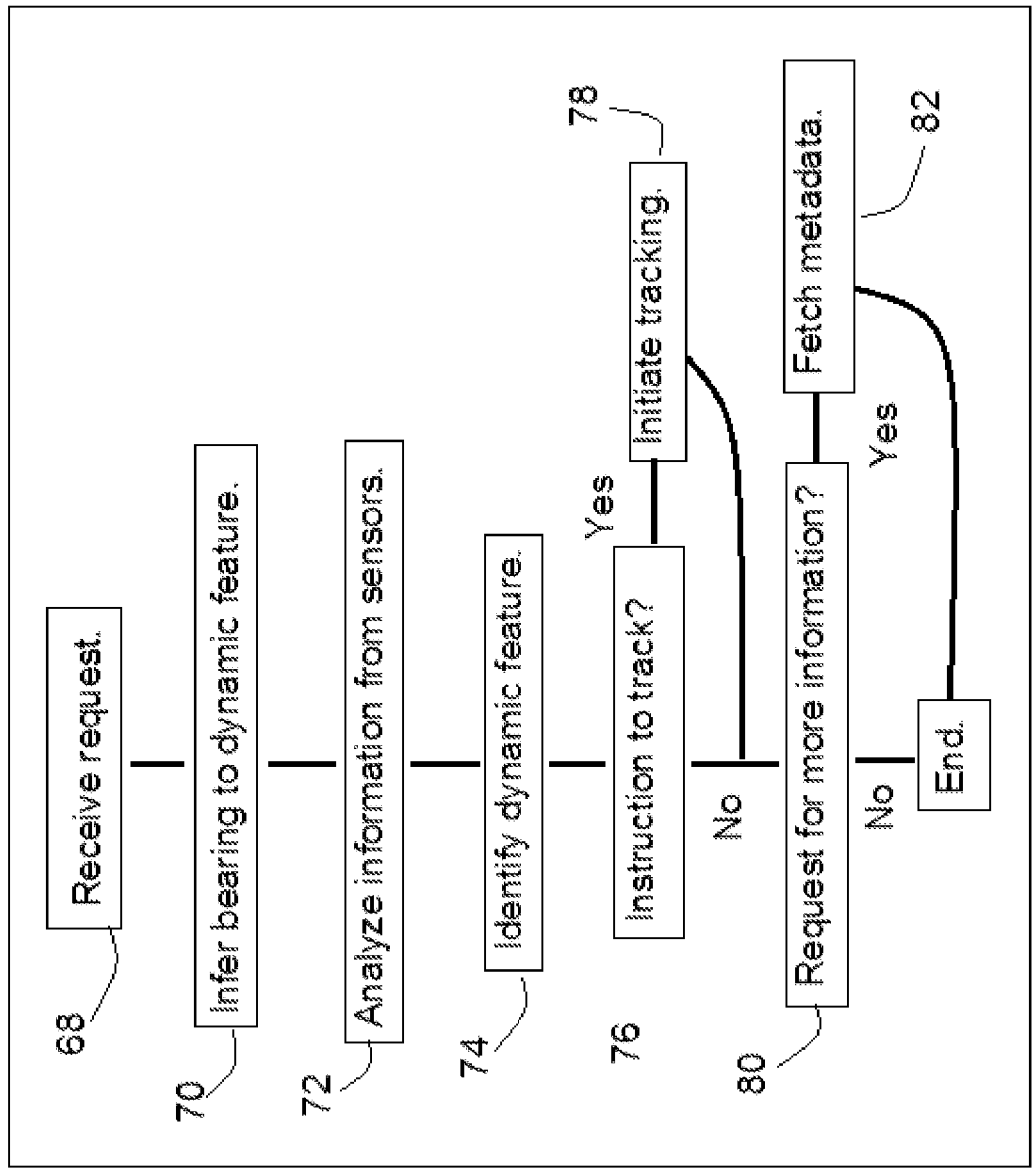
FIG. 4 is a flowchart showing a method of using the infotainment system of FIG. 3.

Referring now to FIG. 4, the infotainment system initially receives a request for information concerning a dynamic feature (step 68). Such information will generally include some indication of a bearing to the dynamic feature. The information can be in the form of a spoken utterance, such as "On my left," which is received by internal microphone 20 or it can take the form of a gesture or glance, detected by internal camera 46, towards the dynamic feature of interest.

Having received this information, the infotainment system proceeds to infer the bearing to the dynamic feature of interest (step 70) and to then analyze information from the various sensors in the external sensor system and the kinematic sensors system (step 72). If possible, the infotainment system identifies the dynamic feature (step 74).

The next step is subject to the occupant's wishes. In some cases, the occupant issues an instruction to track the dynamic feature (step 76). This may occur if the dynamic feature is a lead car of a caravan or procession or motorcade. In such cases, the infotainment system initiates tracking (step 78).

In other cases, the occupant requests additional information about the dynamic feature (step 80). This information may be unavailable. As a result, it is necessary to fetch information about the dynamic feature, i.e., metadata, from a remote source (step 82).

Having described the invention and a preferred embodiment thereof, what is claimed as new and secured by Letters Patent is:

1. An apparatus comprising an infotainment system for responding to a request from an occupant of a vehicle to provide information concerning a dynamic feature, said dynamic feature having a time-varying location relative to a stationary reference frame relative to which said vehicle moves, wherein said vehicle comprises an internal sensor system, an external sensor system, and a kinematic sensor system that comprises a GPS, wherein said infotainment system comprises an identifier that is configured to identify said dynamic feature based at least in part on information from said GPS and information from said external sensor system, wherein said apparatus further comprises an interactor that is configured to determine said dynamic feature's final destination, its origin, its current status, estimated arrival time, traffic status along its route, and current occupancy.

2. The apparatus of claim 1, wherein said infotainment system comprises a remote server that cooperates with a head unit when executing an application and wherein said vehicle comprises a network interface to establish communication with said remote server via a wide-area network.

3. The apparatus of claim 1, wherein said infotainment system executes applications, said applications, among which are said identifier and said dynamic-feature interactor, wherein said identifier and said dynamic-feature interactor cooperate to distinguish a bus from a train and to identify a route number of said bus.

4. The apparatus of claim 1, wherein said dynamic-feature identifier is configured to track said dynamic feature in response to an instruction to track said dynamic feature.

5. The apparatus of claim 1, wherein said infotainment system is configured to receive an instruction from said occupant to track said dynamic feature, wherein said dynamic feature is one of a lead car of a sequence of cars.

6. The apparatus of claim 1, wherein said identifier is configured to identify said dynamic feature as being a particular bus.

7. The apparatus of claim 1, wherein said identifier is configured to identify said dynamic feature as being a particular aircraft.

8. The apparatus of claim 1, wherein said identifier determines a velocity of said dynamic feature relative to said vehicle based on a velocity vector of said dynamic feature.

9. The apparatus of claim 1, wherein said infotainment system is further configured to anticipate relative locations of said vehicle and said dynamic feature in a manner that continuously corrects for traffic fluctuations in real time.

10. The apparatus of claim 1, wherein said infotainment system is configured to receive a request from said occupation for additional information about said dynamic feature, said additional information being unavailable.

11. The apparatus of claim 1, wherein external sensor system comprises an external microphone and said identifier identifies said dynamic feature based at least in part on an acoustic signature detected by said external microphone.

12. The apparatus of claim 1, wherein said infotainment system further comprises an interactor that is configured to receive information from said identifier and to provide additional information concerning said dynamic feature, wherein said additional information is information that is unobservable by said external sensor system and unobservable by said kinematic sensor system.

13. The apparatus of claim 1, wherein said infotainment system further comprises a metadata source and an interactor, wherein said interactor is configured to receive information from said identifier and to obtain, from said metadata source, additional information concerning said dynamic feature and to provide said additional information for communication to said occupant in response to said request.

14. The apparatus of claim 1, wherein said infotainment system further comprises a metadata source that establishes a live link to a head unit of said infotainment system for providing, to said head unit, additional information concerning said dynamic feature.

15. The apparatus of claim 1, wherein said dynamic feature is a bus and said infotainment system is configured to identify a route of said bus, said route comprising an origin and a destination for said bus.

16. The apparatus of claim 1, wherein said identifier is configured to track said dynamic feature over time after having identified said dynamic feature.

17. The apparatus of claim 1, wherein said interactor establishes a live link with a metadata source, wherein, upon establishing said live link and obtaining said occupant's approval, said interactor classifies said dynamic feature as a tracked feature, wherein, having classified said dynamic feature as a tracked feature, said interactor provides dynamic real-time information concerning differences between kinematic vectors associated with said vehicle and kinematic vectors associated with said tracked dynamic feature.

18. A method comprising receiving a request from an occupant of a vehicle for information concerning a dynamic feature and identifying said dynamic feature based at least in part on of information from a GPS that is a constituent of a kinematic sensor system of said vehicle and information from said external sensor system of said vehicle, wherein said dynamic feature is a feature that is moving relative to a reference frame relative to which said vehicle moves, wherein said method further comprises determining said dynamic feature's final destination, its origin, its current status, estimated arrival time, traffic status along its route, and current occupancy.

19. The method of claim 18, wherein said dynamic feature that is visible to said occupant and wherein said method further comprises requesting, from a remote server via a network interface for providing communication with said remote server via a wide-area network, additional information concerning said dynamic feature, wherein said remote server retrieves said additional information from a metadata source, and wherein said method further comprises receiving said additional information from said remote server.

* * * * *